US012754897B2

(12) United States Patent
Verma

(10) Patent No.: US 12,754,897 B2
(45) Date of Patent: Oct. 6, 2026

(54) SYSTEMS AND METHODS FOR DYNAMIC AND SELF-OPTIMIZATION FOR MANAGING DATABASE TRANSFORMATIONS

(71) Applicant: BANK OF AMERICA CORPORATION, Charlotte, NC (US)

(72) Inventor: Sandeep Verma, Gurugram (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/582,026

(22) Filed: Feb. 20, 2024

(65) Prior Publication Data

US 2025/0265236 A1 Aug. 21, 2025

(51) Int. Cl.
*G06F 16/22* (2019.01)
*G06F 11/34* (2006.01)
*G06F 16/21* (2019.01)

(52) U.S. Cl.
CPC ...... *G06F 16/2282* (2019.01); *G06F 11/3419* (2013.01); *G06F 16/211* (2019.01)

(58) Field of Classification Search
CPC . G06F 16/2282; G06F 16/211; G06F 11/3419
See application file for complete search history.

(56) References Cited

U.S. PATENT DOCUMENTS 5,822,747 A 10/1998 Graefe
6,330,552 B1 * 12/2001 Farrar ................ G06Q 30/0283 707/999.001
6,353,818 B1 * 3/2002 Carino, Jr. ........ G06F 16/24542
7,209,923 B1 * 4/2007 Cooper ................. G06F 16/285
(Continued)

FOREIGN PATENT DOCUMENTS

AU 2022200375 A1 4/2022
CN 115905174 A * 4/2023

OTHER PUBLICATIONS

Gyssens et al., "Tables As a Paradigm for Querying and Restructuring", Jun. 1996, PODS '96: Proceedings of the fifteenth ACM SIGACT-SIGMOD-SIGART symposium on Principles of database systems, pp. 93-103, https://doi.org/10.1145/237661.237688 (Year: 1996).*

(Continued)

*Primary Examiner* — Syed H Hasan
*Assistant Examiner* — Robert F May
(74) *Attorney, Agent, or Firm* — Moore & Van Allen PLLC; Lauren M. Stokes

(57) ABSTRACT

Systems, computer program products, and methods are described herein for dynamic and self-optimization for managing database transformations. The present disclosure is configured to identify data; apply the data to a split database table, wherein the split database table comprises a minor portion and a major portion; partition the data and assign the data to at least one of the major portion or the minor portion based on a partitioning logic; generate a plurality of option tables based on the data of the minor portion, wherein each option table of the plurality of option tables comprises an option data structure; generate an optimization score for each option table; and identify an optimized data structure from the plurality of option tables based on the optimization score for each option table.

19 Claims, 9 Drawing Sheets

(56) References Cited

U.S. PATENT DOCUMENTS

| | | | |
|---|---|---|---|
| 7,359,922 | B2 | 4/2008 | Young-Lai |
| 7,580,941 | B2 * | 8/2009 | Narasayya ............ G06F 16/217 |
| 7,979,422 | B2 * | 7/2011 | Belknap ............ G06F 16/24547 707/713 |
| 9,720,967 | B2 | 8/2017 | Lee |
| 9,892,159 | B2 | 2/2018 | Fraser |
| 10,191,947 | B2 * | 1/2019 | Das ................... G06F 16/24554 |
| 10,554,771 | B2 | 2/2020 | Park |
| 11,061,902 | B2 | 7/2021 | Idicula |
| 11,144,047 | B2 | 10/2021 | Cella |
| 11,176,140 | B2 | 11/2021 | Martin |
| 11,215,980 | B2 | 1/2022 | Cella |
| 11,231,705 | B2 | 1/2022 | Cella |
| 11,436,213 | B1 | 9/2022 | Waas |
| 11,468,062 | B2 | 10/2022 | Sung |
| 11,588,883 | B2 | 2/2023 | Waas |
| 11,816,126 | B2 | 11/2023 | Wilson |
| 11,829,360 | B2 | 11/2023 | Lee |
| 2007/0162425 | A1 * | 7/2007 | Betawadkar-Norwood ................. G06F 16/24535 |
| 2007/0192372 | A1 * | 8/2007 | Bestgen .................. G06F 16/21 |
| 2007/0299810 | A1 * | 12/2007 | Riedel ................... G06F 16/217 |
| 2008/0222087 | A1 * | 9/2008 | Balmin ............... G06F 16/8365 |
| 2012/0109936 | A1 * | 5/2012 | Zhang ..................... G06F 11/34 707/E17.017 |
| 2013/0042087 | A1 * | 2/2013 | Shah ..................... G06F 9/5077 711/E12.002 |
| 2015/0310044 | A1 * | 10/2015 | Isaacson ............... G06F 16/256 707/613 |
| 2016/0179891 | A1 * | 6/2016 | Bowman ............. G06F 16/9027 707/720 |
| 2017/0249360 | A1 * | 8/2017 | Alpers .............. G06F 16/24544 |
| 2018/0218038 | A1 * | 8/2018 | Katahira ........... G06F 16/24542 |
| 2020/0125545 | A1 * | 4/2020 | Idicula .................. G06F 16/217 |
| 2020/0278966 | A1 | 9/2020 | Al-Omari |
| 2021/0318938 | A1 * | 10/2021 | Benke ................. H04L 61/2503 |
| 2022/0043424 | A1 | 2/2022 | Cella |
| 2022/0070235 | A1 | 3/2022 | Yerli |
| 2023/0129468 | A1 * | 4/2023 | Liu ....................... G06F 16/278 707/715 |
| 2023/0319129 | A1 | 10/2023 | Falcao |
| 2024/0403295 | A1 * | 12/2024 | Panikkar ........... G06F 16/24542 |
| 2026/0037510 | A1 * | 2/2026 | Vinnakota ......... G06F 16/24542 |

OTHER PUBLICATIONS

Green et al. "Recomputing Materialized Instances after Changes to Mappings and Data", 2012 IEEE 28th International Conference on Data Engineering, Arlington, VA, USA, 2012, pp. 330-341, doi: 10.1109/ICDE.2012.107. (Year: 2012).*

* cited by examiner

700

| EXAMPLE QUERY | OCCURRENCE COUNT | PREFERENCE QUERY WEIGHT (OUT OF 1) | RESPONSE TIME/COST OF EXECUTION (COMPUTING RESOURCE EXECUTION) | | | |
|---|---|---|---|---|---|---|
| | | | OPTION 1 | OPTION 2 | OPTION 3 | OPTION 4 |
| SELECT * FROM CLIENT WHERE ID = :ID | 2,300,000 | .9 | 220 | 120 | 300 | 250 |
| SELECT * FROM CLIENT WHERE CITY = :CITY AND STATE = :STATES | 100,000 | .08 | **150** | 220 | 180 | 190 |
| INSERT TO CLIENT | ~2,000 | .019 | 330 | **180** | 290 | 310 |
| DELETE FROM CLIENT | ~10 | .001 | 405 | 910 | 1000 | 600 |

FIGURE 7

SYSTEMS AND METHODS FOR DYNAMIC AND SELF-OPTIMIZATION FOR MANAGING DATABASE TRANSFORMATIONS

TECHNOLOGICAL FIELD

Example embodiments of the present disclosure relate to dynamic and self-optimization for managing database transformations.

BACKGROUND

Databases can be organized and designed in a number of different methods, but often with each of these methods many issues are present at the outset or are discovered later. Additionally, and to rectify some of these issues, database and application developers may have to customize the databases manually, which leads to longer downtime for the database and to databases that may only work for a particular purpose (e.g., may only work for a particular query and not other queries). Such issues may cause lowered response time for getting results from database queries, longer downtimes to design the databases to meet a current need or request, greater computer resources used by developers in designing or reconfiguring the databases regularly, and other such computing and network response issues. Thus, there exists a need for a system, method, and/or computer program product that can dynamically and self-optimize database transformations in an automatic, efficient, dynamic, and secure manner.

Applicant has identified a number of deficiencies and problems associated with optimizing databases via database transformations. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for dynamic and self-optimization for managing database transformations.

In one aspect, a system for dynamic and self-optimization for managing database transformation is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify data; apply the data to a split database table, wherein the split database table comprises a minor portion and a major portion; partition the data and assign the data to at least one of the major portion or the minor portion based on a partitioning logic; generate a plurality of option tables based on the data of the minor portion, wherein each option table of the plurality of option tables comprises an option data structure; generate an optimization score for each option table; and identify an optimized data structure from the plurality of option tables based on the optimization score for each option table.

In some embodiments, executing the computer-readable code is configured to cause the at least one processing device to: apply the optimized data structure to the major portion of the split database table; and automatically, based on the application of the optimized data structure, optimize the split database table.

In some embodiments, executing the computer-readable code is configured to cause the at least one processing device to apply a continuous performance tuning to the identification of the optimized data structure. In some embodiments, the continuous performance tuning occurs at predefined intervals.

In some embodiments, the minor portion comprises a small portion of the split database table and the major portion is a larger portion of the split database table.

In some embodiments, the optimization score is generated based on a response time for each option table.

In some embodiments, the optimization score is generated based on a resource execution burden for each option table.

In some embodiments, the optimization score for each option table are compared for the plurality of option tables, and wherein the optimized data structure is identified based on a lowest optimization score.

In some embodiments, the optimized data structure is identified based on a query occurrence count and a predefined query weight.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
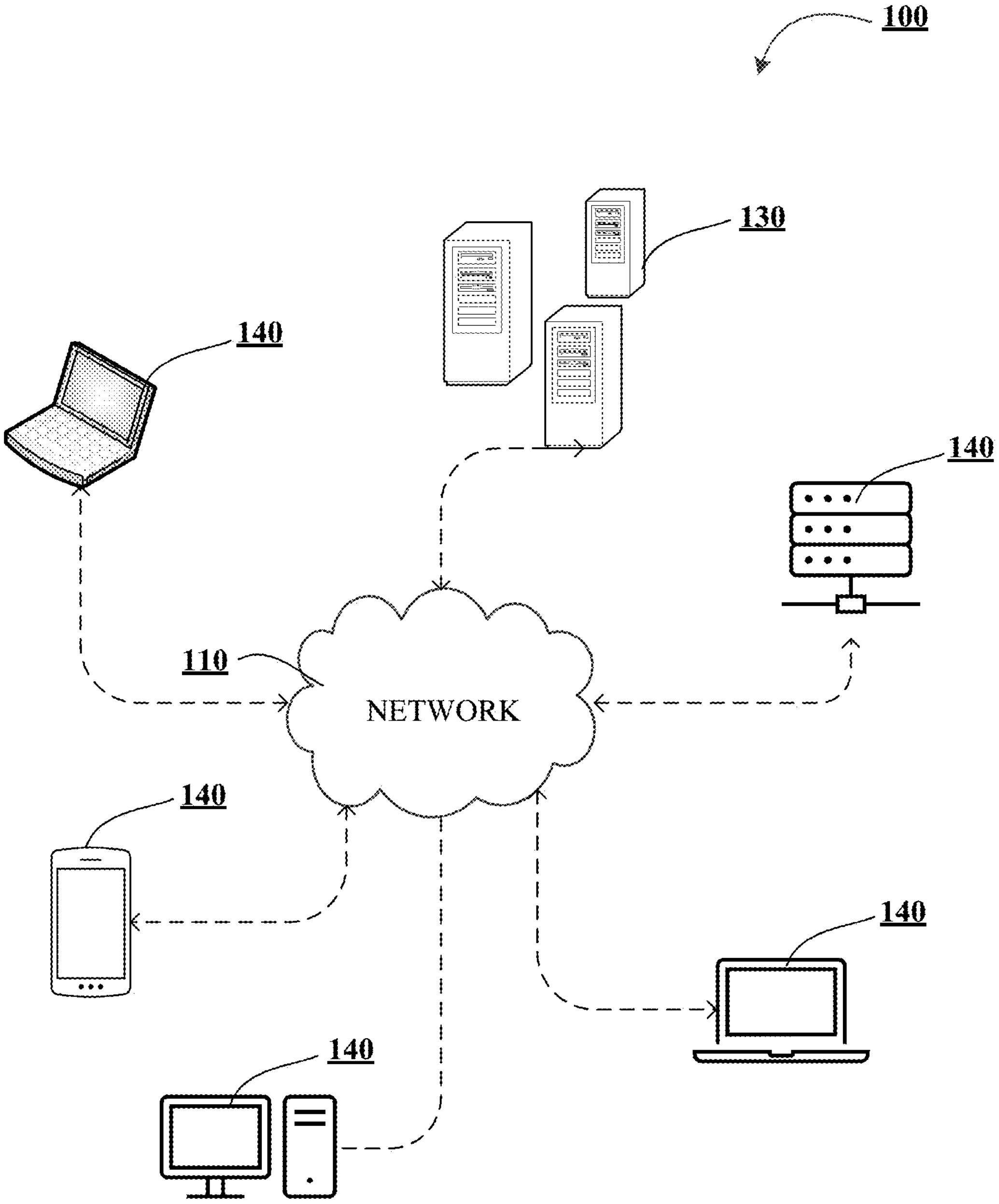
Figure 1B:
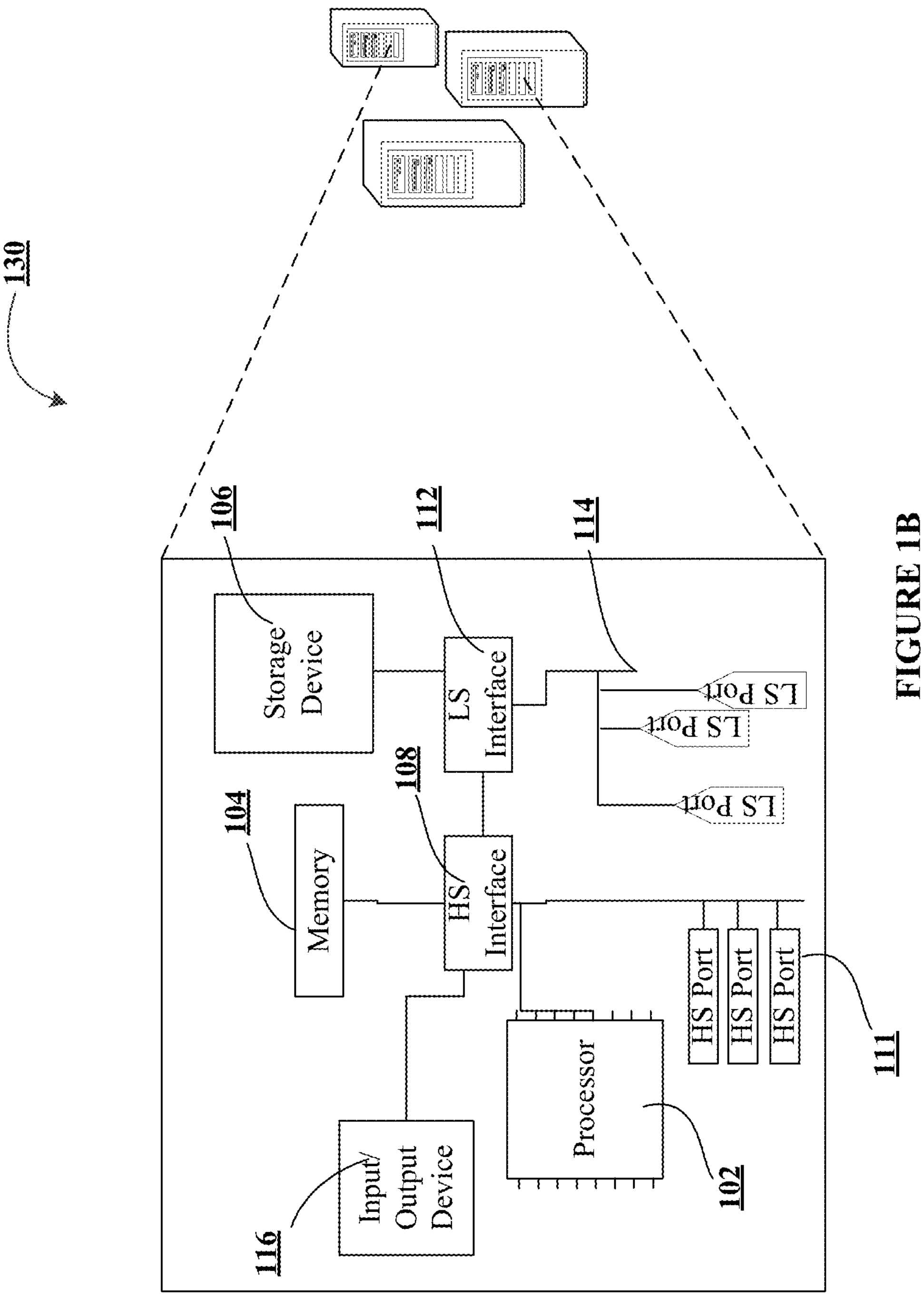
Figure 1C:
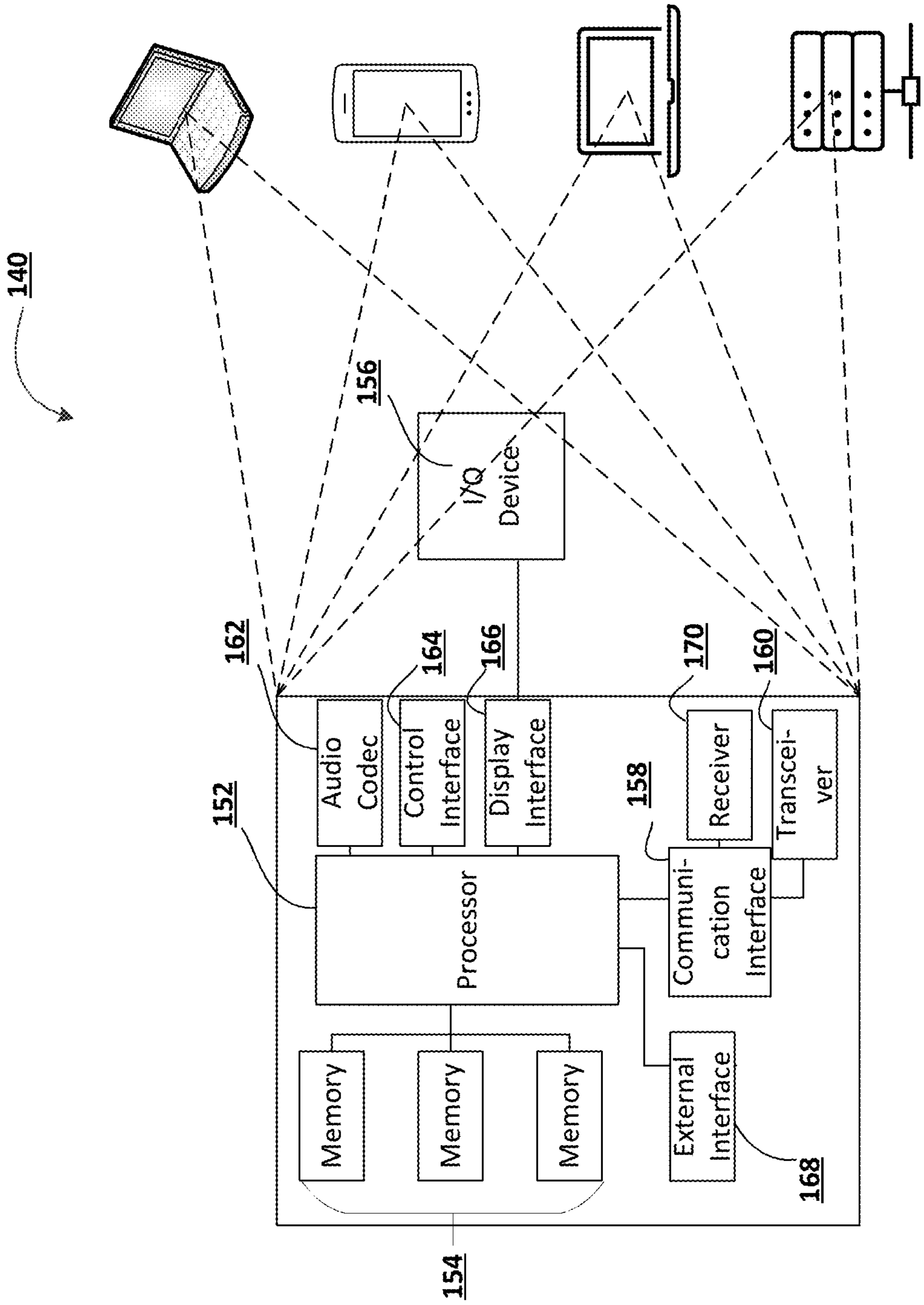
Figure 2:
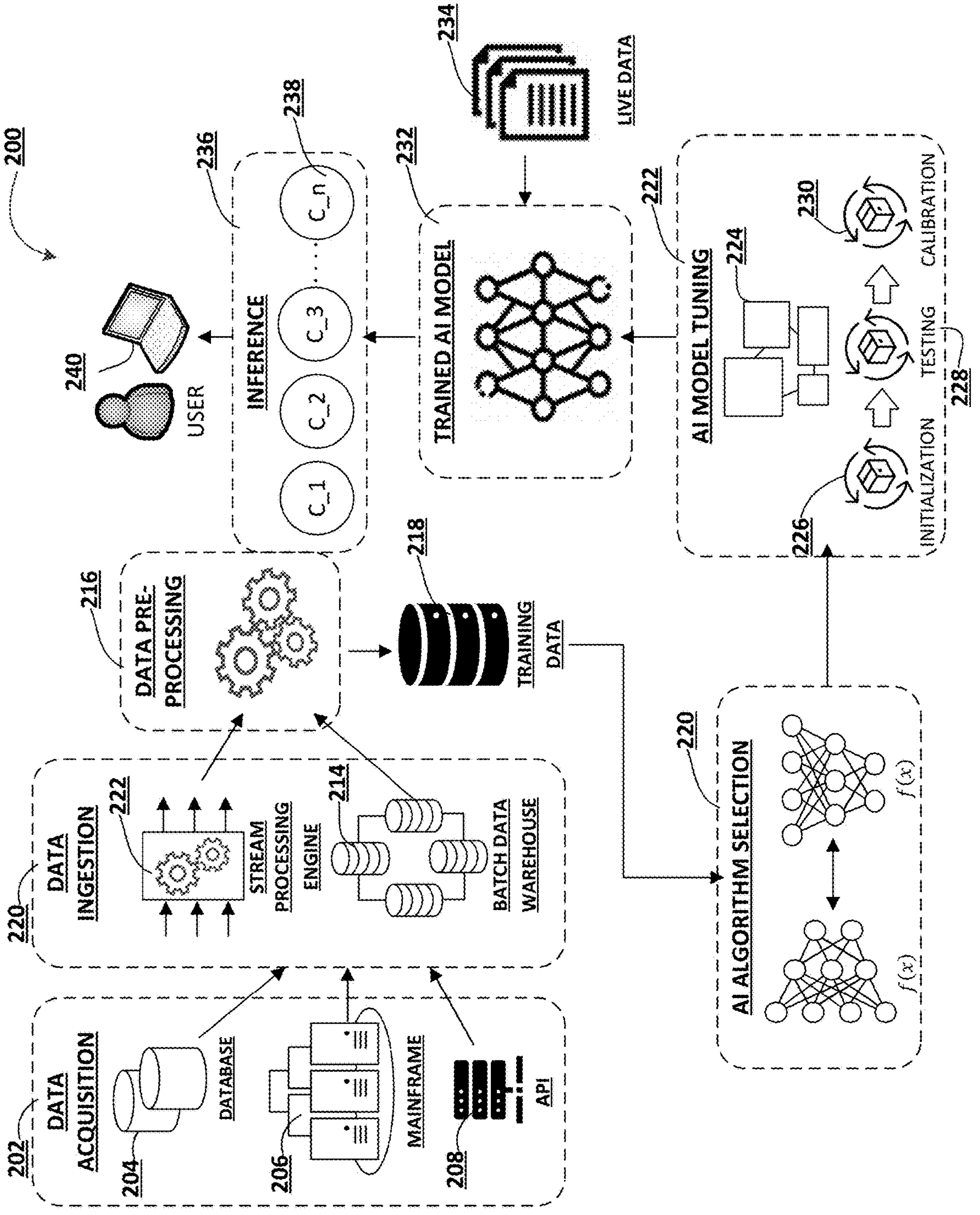
Figure 3:
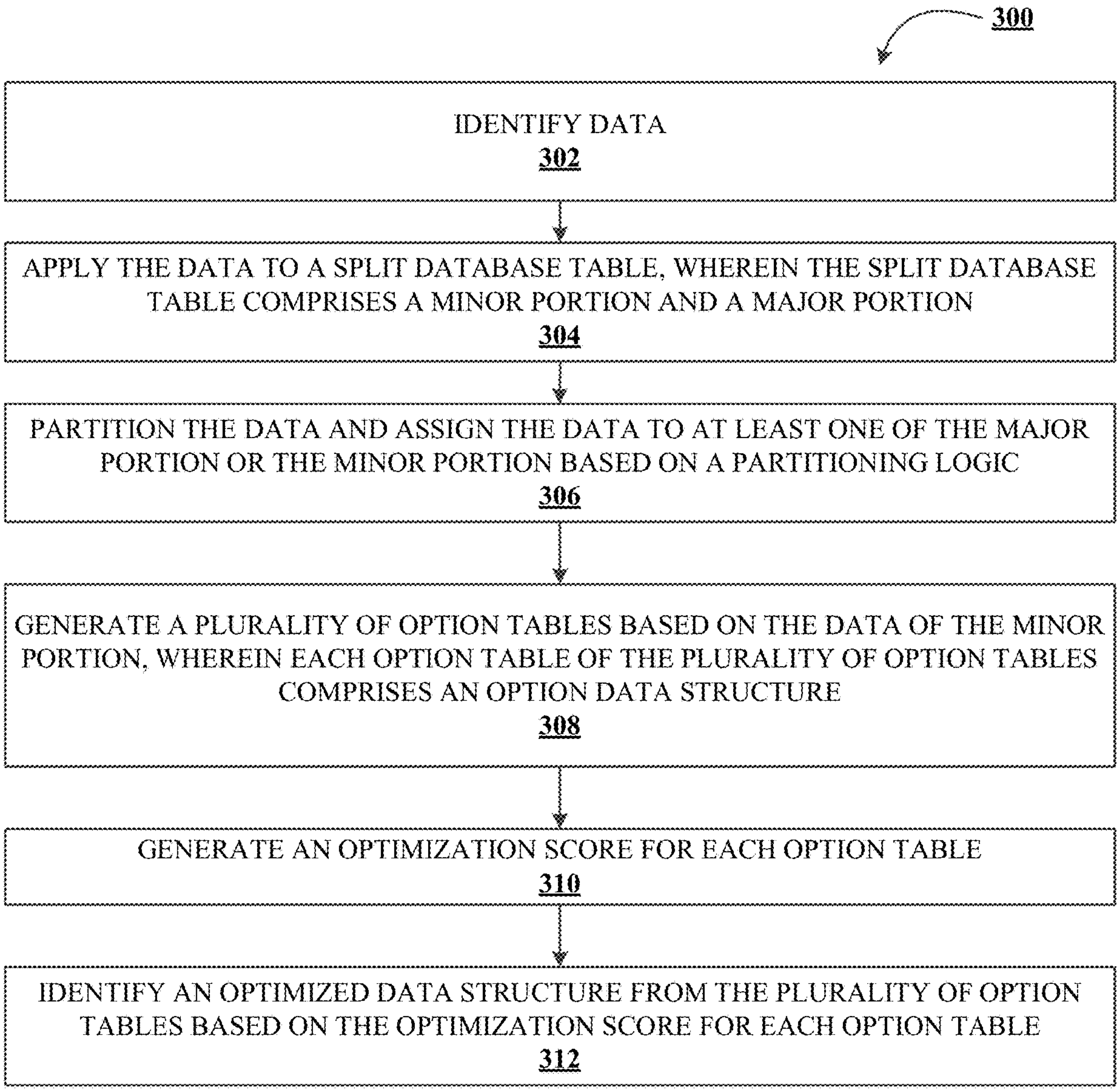
Figure 4:
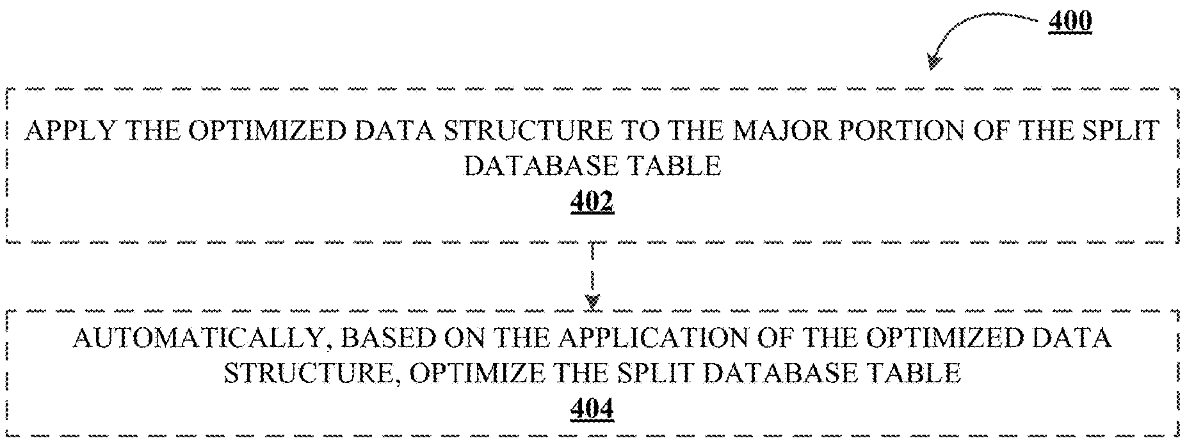
Figure 5:
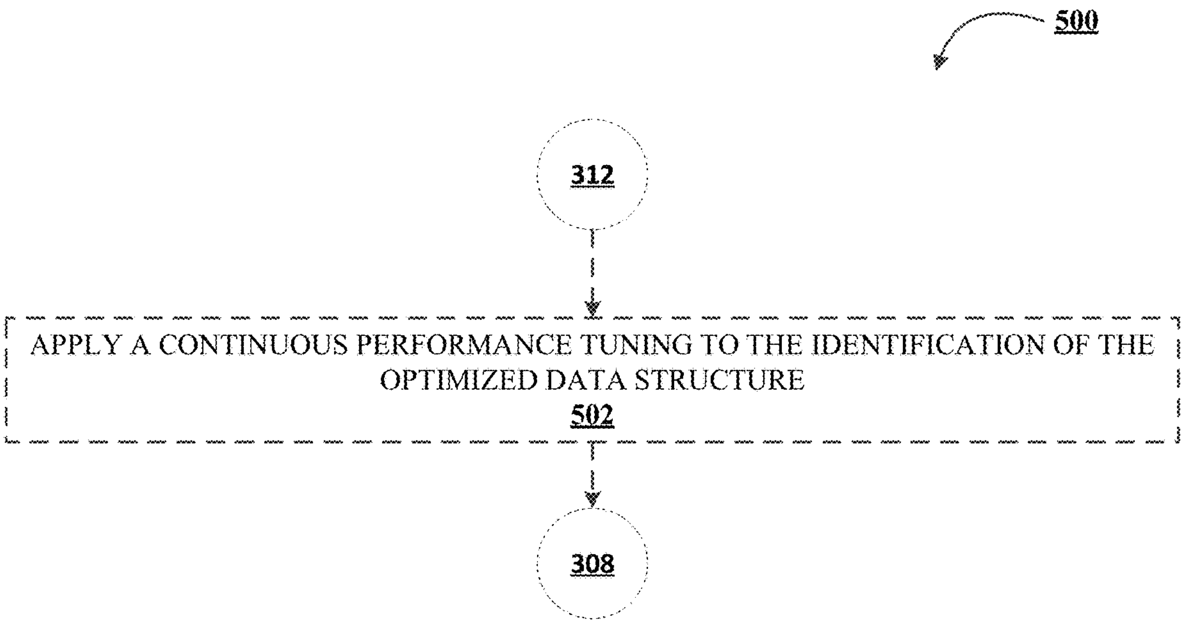
Figure 6:
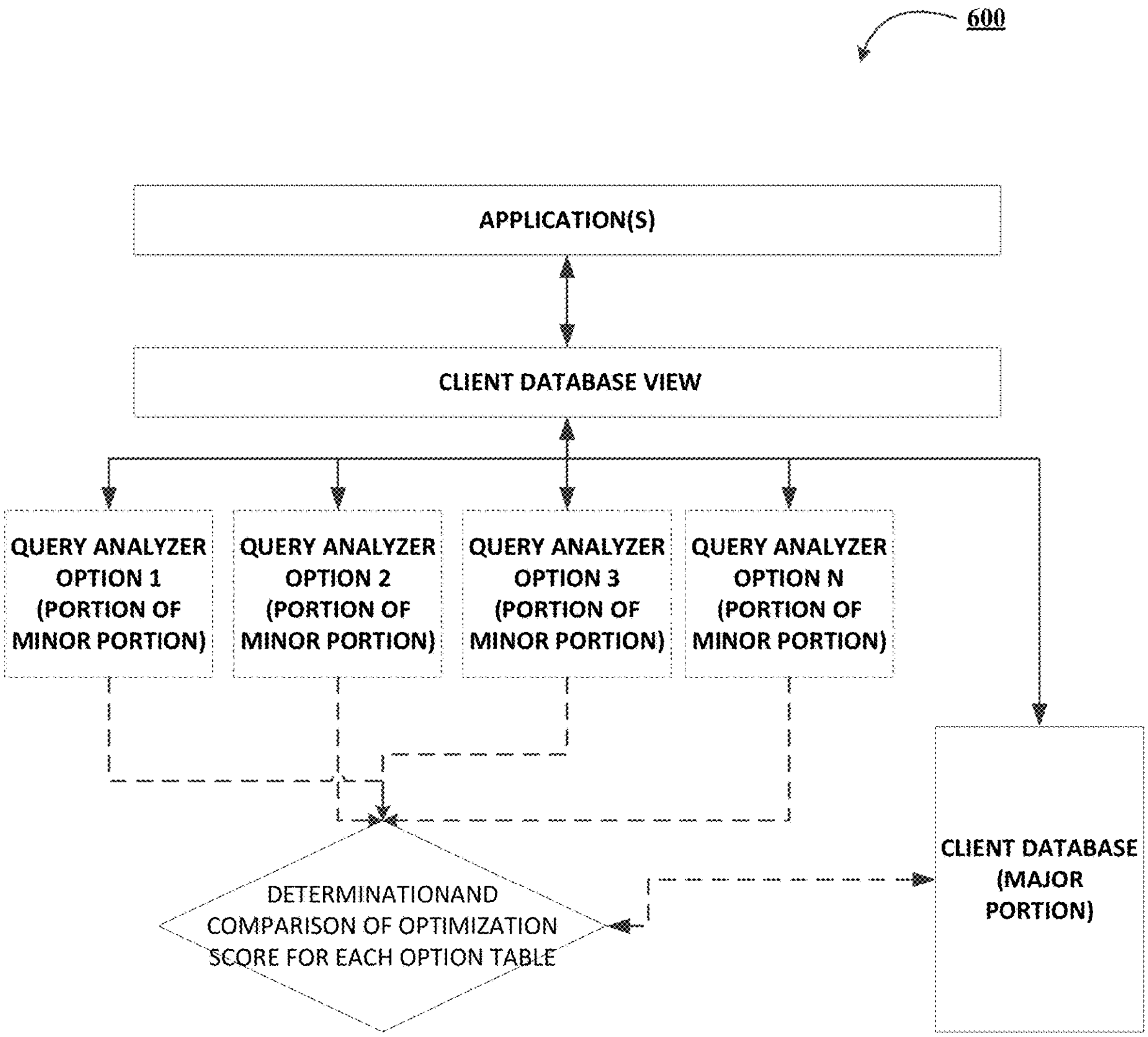

FIGS. 1A-1C illustrates technical components of an exemplary distributed computing environment for dynamic and self-optimization for managing database transformations, in accordance with an embodiment of the disclosure;

FIG. 2 illustrates an exemplary artificial intelligence (AI) engine subsystem architecture, in accordance with an embodiment of the disclosure;

FIG. 3 illustrates a process flow for dynamic and self-optimization for managing database transformations, in accordance with an embodiment of the disclosure;

FIG. 4 illustrates a process flow for automatically optimizing the split database table, in accordance with an embodiment of the disclosure;

FIG. 5 illustrates a process flow for applying a continuous performance tuning to the identification of the optimized data structure, in accordance with an embodiment of the disclosure;

FIG. 6 illustrates a flow diagram for dynamic and self-optimization for managing database transformations, in accordance with an embodiment of the disclosure; and FIG. 7 illustrates an exemplary table of data for identifying the optimized data structure from the plurality of option tables, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to devices, computing components, databases, software applications, application programming interfaces, user devices, graphical user interfaces, software as a service (SAAS), and the like, and/or the ability and opportunity to access and use the same. Some example implementations herein contemplate property held by a user, including property that is stored and/or maintained by a third-party entity.

Databases can be organized and designed in a number of different methods, but often with each of these methods many issues are present at the outset or are discovered later. Additionally, and to rectify some of these issues, database and application developers may have to customize the databases manually, which leads to longer downtime for the database and to databases that may only work for a particular purpose (e.g., may only work for a particular query and not other queries). Such issues may cause lowered response time for getting results from database queries, longer downtimes to design the databases to meet a current need or request, greater computer resources used by developers in designing or reconfiguring the databases regularly, and other such computing and network response issues. Thus, there exists a need for a system, method, and/or computer program product that can dynamically and self-optimize database transformations in an automatic, efficient, dynamic, and secure manner.

Accordingly, the present disclosure provides for an identification of data; an application of the data to a split database table, wherein the split database table comprises a minor portion and a major portion; a partition of the data and assign the data to at least one of the major portion or the minor portion based on a partitioning logic; and a generation of a plurality of option tables based on the data of the minor portion, wherein each option table of the plurality of option tables comprises an option data structure. Additionally, the disclosure provides for a generation of an optimization score for each option table; and an identification of an optimized data structure from the plurality of option tables based on the optimization score for each option table.

In other words, the disclosure provides a self-optimizing database table that is split into two sections of data, one that makes up the majority of the data stored (e.g., 99%) and one that only makes up a small fraction of data stored (1% or less), which may comprise data with various copies of the same data copied in different optimized structures (e.g., comprising extra indexes, partitions, and/or different combinations). A single optimized structure may be selected and implemented on the majority of the data, after determining which optimized structure comprises the lowest response time (such as for data extraction, and/or the like) and the lowest number of computing resources used or necessary for use. Thus, the disclosure uses a self-optimizing database table, which keeps evaluating its own data and various queries that are interacting with the database table, and periodically changes its table structures (e.g., the 1%), such as by indexes, partitioning, hashing, and/or the like). Additionally, the disclosure provides for uneven partitioning within the database table, wherein the major portion will hold a different and optimized data structure and the minor portion will hold different performance-based structural options which will decide the next optimization recommendation for the table.

What is more, the present disclosure provides a technical solution to a technical problem. As described herein, the technical problem includes optimization of databases. The technical solution presented herein allows for the automatic, dynamic, efficient, and secure self-optimization of database tables via data transformations, which is described in more detail below. In particular, the disclosure is an improvement over existing solutions to the optimization of databases, (i) with fewer steps to achieve the solution, thus reducing the amount of computing resources, such as processing resources, storage resources, network resources, and/or the like, that are being used (e.g., by partition the database table with a major portion and a minor portion, where the minor portion is used to hold the different performance-based options, the database table can optimize itself from these options at regular intervals); (ii) providing a more accurate solution to problem, thus reducing the number of resources required to remedy any errors made due to a less accurate solution (e.g., by a regular and periodic self-optimization of the database table, which continually learns from itself and the queries it receives); (iii) removing manual input and waste from the implementation of the solution, thus improving speed and efficiency of the process and conserving computing resources (e.g., by reducing and/or eliminating manual intervention and manual database table restructuring); (iv) determining an optimal amount of resources that need to be used to implement the solution, thus reducing network traffic and load on existing computing resources (e.g., by using the number of computing resources necessary for each option within the minor portion in making its determination of which option to use in restructuring the database table, the disclosure provides for lowered resource consumption). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for dynamic and self-optimization for managing database transformations 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for dynamic and self-optimization for managing database transformations, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300.

As shown in block 302, the process flow 300 may include the step of identifying data. For example, the system may identify the data from an application (or a plurality of applications), from a database, from a storage component (hardware and/or software), and/or the like. In some embodiments, the data may be identified based on the queries associated with the data (e.g., where the higher the number of queries the more important the data should be considered, and the more important data storage optimization is) and/or based on the response time of the queries associated with the data. In some embodiments, the data identified and applied may be pre-selected or pre-identified by a client of the system that wishes to optimize the queries and processes associated with the data and its storage, its callups, its API requests, its interactions with the data, and/or the like.

In some embodiments, data may be identified on predefined periodic bases, such that the data stored in databases (such as a database table associated with an application, a client database, a system database, a storage component, and/or the like) is periodically and regularly analyzed (e.g., based on periodic intervals) by the system and processes described herein to optimize the split database table regularly and continuously.

As shown in block 304, the process flow 300 may include the step of applying the data to a split database table, wherein the split database table comprises a minor portion and a major portion. For example, the system may apply the data to a split database table, whereby the split database table comprises a major portion and a minor portion. Such a split database table may be used by the system to split the data from the data identified to at least one option table, or a plurality of option tables, which may then be analyzed to determine which option table is optimal (e.g., which option table has the lowest response time over the cost of execution/number of computing resources used). Additionally, and in some embodiments, the minor portion may comprise a small portion (e.g., 1% or 0.1%) of the split database table and the major portion may comprise a larger portion of the split database table (e.g., 99%). In this manner, the major portion may store and organize the data associated with the identified data (e.g., the identified data itself, data stored with the identified data in a database, index, and/or the like that was input or applied to the split database table, and/or the like), whereby the data associated with the identified data is currently organized in a manner prescribed by the major portion of the split database table. Thus, and in some embodiments, once an optimized data structure from the option tables is identified and selected, the organization of the optimized data structure may applied to the major portion in order to automatically, dynamically, and continuously self-optimize the database table.

In some embodiments, the split database table may be stored in a split database table interface component, whereby the split database table interface component is transmitted from the system (e.g., over a network) to a user device (such as a user device associated with a client of the system). Such a split database table interface component may configure (e.g., automatically) graphical user interface (GUI) of the user device a client database view. In some such embodiments, the client database view may be artificial intelligence (AI) based, such that the AI engine may determine the option tables to present to a client at the user device based on the underlying data of each option table.

As shown in block 306, the process flow 300 may include the step of partitioning the data and assigning the data to at least one of the major portion or the minor portion based on a partitioning logic. For instance, the identified data may be partitioned between the major portion or the minor portion of the split database table, and further may be partitioned between option tables within the minor portion of the split database table. In some embodiments, the partitioning logic will cause multiple copies of the same data to be copied to the same option tables, but with different optimized structures (e.g., potential optimized structures to make each option table). For example, a few of the option tables with the different optimized structures may comprise extra indexes, partitions, or different combination(s) of performance driven designs. In other words, the partitioning logic may act to partition and assign the data to at least one of the major portion or the minor portion of the split database table, or to both the major and minor portions in different configurations (e.g., indexes, partitions, and/or the like).

Additionally, and in some embodiments, the partitioning logic may use sampling and/or evaluation configuration limits (e.g., the available memory for the minor portion that simultaneous evaluation of each of the minor portion's option tables may be used) for the minor portion, and the rest of the data not partitioned to the minor portion will go to the major portion. For example, and in some embodiments, the sampling and/or evaluation configuration limits may comprise a key of 25% for each option table within the minor portion (e.g., 25% of the 1% allotted to the minor portion) such that four option tables may be evaluated simultaneously. Thus, the system and its process will not duplicate the data, but instead will distribute the records (e.g., data) per the evaluation and sampling parameters (e.g., where an evaluation parameter is limited to 1% of data, then the data will be split according the amount within the identified data at the current time, such as 99% of the data will be applied and split to the major portion and 1% will be applied and split to the minor portion).

As shown in block 308, the process flow 300 may include the step generating a plurality of option tables based on the data of the minor portion, wherein each option table of the plurality of option tables comprises an option data structure. Additionally, and as described above, once the data has been partitioned between the minor or major portion, the data assigned to the minor portion may be used to generate a plurality of option tables which may be simultaneously evaluated for different performance-based structural options of how to organize (e.g., index, partition, hash, and/or the like) the data between the option tables. Based on the different performance-based structural options, each option table will comprise its own option data structure.

As shown in block 310, the process flow 300 may include the step of generating an optimization score for each option table. For example, the system may generate an optimization score for each option table based on how each option table performs for the overall functions, queries, and/or the like, that are often seen by the system and/or often seen for accessing or interacting with the data (e.g., which queries are submitted the most, which data requests are submitted the most, and/or the like). Thus, and in some embodiments, the optimization score may be based on the response time for answering these particular queries and which response time is lowest or quickest may cause the lowest optimization score, which in turn may indicate to the system that the option table with the lowest optimization score should be chosen for application to the major portion. Further, and in some embodiments, the optimization score may further be based on the number of computing resources used for each option table, whereby the less computing resources used for responding to the query(ies), the lower the optimization score. Thus, and in some embodiments, the optimization score for each option table may compared for the plurality of option tables, and wherein the optimized data structure is identified based on a lowest optimization score.

In some embodiments, either during the generation of the optimization score or in response to the optimization score being generated, the system may generate a database view of the major and/or minor portions of the split database table. In this manner, the database view may comprise the data of the major and/or the minor portion and may be transmitted to a user device to configure the user device's GUI to show the major and/or minor portion data to a user of the user device. In some embodiments, this user may be a developer (such as a developer associated with a client of the system) that would like to view and interact with the data of the option tables (e.g., such as by setting their own pre-defined query weight for each of the queries performed by the option tables). For example, a developer may input (via the user device and the user device may transmit such data to the system over a network, such as network 110 of FIG. 1A) preference query weight indicating which queries should be considered the most important by the system in analyzing each option table's performance (e.g., the preference query weight may be out of 1, and whereby the closer the weight is to 1, the higher the importance or preference the query is to the developer). In some embodiments, the database view may be AI-based, and certain outputs or parameters generated at the database view may be generated by an AI engine (similar to the one described above with respect to FIG. 2). For example, and in some embodiments, the preference query weight may be generated by an AI engine analyzing the system associated with the identified data used to generate the option tables, whereby the system—through its AI engine—may use data associated with when the queries are generated/submitted (e.g., late at night may indicate back-end processes that occur regularly but are unimportant) to determine the preference query weight of each query. In this manner, the AI engine may be pre-trained on historical data regarding previous queries and previous data to determine which data—currently—and its queries should be weighted heavier. In some embodiments, the training of the AI engine may occur via a feedback loop, such that the AI engine is continuously refined based on manual feedback and/or based on system feedback.

In some embodiments, a query analyzer function may be combined with the processes described herein, and the query analyzer function may record all the queries passing through it (e.g., the queries submitted for the option tables which have previously been tracked either by the system itself, by a client system, by an application, by an API tracker, and/or the like), the response time for each query and for each option table, each output payload size for each query, and/or the like. In this manner, the query analyzer function may be placed between a view (which may act like a wrapper to combine data from the major and minor portions) and the minor portion, and will collect data from the minor portion as it conducts the simultaneous performance evaluations based on each query.

Additionally, and in some embodiments, upon performing the query analyzer function, the system may transmit or send the outputs (e.g., the recorded queries, the response time, the number of times the query has occurred, the output payload size, and/or the like) to a data aggregator module, such may be configured to collect and organize the data from the query analyzer function for comparison of each of the performance metrics of each option table. Such an exemplary data aggregator module is shown in FIG. 7. In this manner, and in some embodiments, the system or developers viewing the database view comprising the data aggregator module may analyze the data aggregator output to see all the queries that an option table is interacting, how each of the option tables are structured or organized (e.g., where columns could be the same, but indexes, partitioning, hashing, and/or the like may vary) and their performance against each option table.

As shown in block 312, the process flow 300 may include the step of identifying an optimized data structure from the plurality of option tables based on the optimization score for each option table. For example, the system may determine or identify the optimized data structure from the option tables as the option table with the lowest optimization score (e.g., lowest response time and/or lowest response time divided by lowest computing resource cost or resource execution burden, which refers to the number of computing resources needed to perform the query for each option table). Thus, the data structure of the option table with the lowest optimization score may be used as the basis for the optimized data structure which will be applied to the major portion of the split database table.

In some embodiments, and as described briefly above, the optimized data structure may additionally be based on a query occurrence (e.g., based on the number of times a query has occurred may indicate the query's importance to a system/client system) and/or a predefined query weight (e.g., a weight generated and/or input by a developer of the system/client system which may indicate an importance for each query). In this manner, the identification of the optimized data structure may additionally be based on the query occurrence and/or the predefined query weight, which may affect which option table is used as the basis for the optimized data structure applied to the major portion.

FIG. 4 illustrates a process flow 400 for automatically optimizing the split database table, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400.

In some embodiments, and as shown in block 402, the process flow 400 may include the step of applying the optimized data structure to the major portion of the split database table. For example, and in some embodiments, the system may apply the optimized data structure of process flow 300 to the major portion to update the data structure and organization of data within the major portion (e.g., along with the data of the minor portion's option table selected for the optimized data structure) for optimized performance. In this manner, the system and tis database(s) may actively, automatically, dynamically, and efficiently self-optimize itself.

In some embodiments, and as shown in block 404, the process flow 400 may include the step of automatically—based on the application of the optimized data structure—optimize the split database table. Additionally, and in some embodiments, the system automatically—upon identifying the optimized data structure—update the major portion of the split database table. In this manner, less computing resources may be used as less manual intervention or interaction will be needed to complete the processes described herein. In some embodiments, however, the system may wait for a user input transmitted from a user device (e.g., such as a user device associated with a developer) indicating an acceptance of an optimized data structure before updating/optimizing the split database.

FIG. 5 illustrates a process flow 500 for applying a continuous performance tuning to the identification of the optimized data structure, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500.

In some embodiments, and as shown in block 502, the process flow 500 may include the step of applying a continuous performance tuning to the identification of the optimized data structure. For example, and in some embodiments, a continuous performance tuning may occur at predefined intervals, such that the identification of the optimized data structure is continuously identified and refined based on current data. In this manner, the continuous performance tuning may be likened to a scheduler (e.g., daily, weekly, monthly, and/or the like) for the system to generate a minor portions with its option tables, analyze the minor portion and its option tables, and update the major portion at regular/pre-defined intervals (e.g., daily, weekly, monthly, and/or the like). Such a continuous performance tuning may be used to make sure the split database table is continuously and optimally organized, partitioned, indexed, and/or the like, for the current needs of the data within the split database table, and that the performance in outputting data for queries is always optimal.

In some embodiments, such a process like that described herein with respect to block 502 may follow the process described herein with respect to block 312. Similarly, and in some embodiments, the process described herein with respect to block 502 may precede the process described herein with respect to block 208, such that the continuous performance tuning may occur as a feedback mechanism between identifying the optimized data structure at one time and at a later time, generate a plurality of new option tables for a new identification of an optimized data structure. In this manner, the continuous performance tuning may be used to continuously refine, filter, and identify option tables to choose from for an optimized data structure, such that the optimized data structure identified and selected is the most efficient and accurate data structure for the major portion of the split data table.

FIG. 6 illustrates a flow diagram 600 for dynamic and self-optimization for managing database transformations, in accordance with an embodiment of the disclosure. In some embodiments, a system (e.g., similar to one or more of the systems described herein with respect to FIGS. 1A-1C) may perform one or more of the steps of flow diagram 600. For example, a system (e.g., the system 130 described herein with respect to FIG. 1A-1C) may perform the steps of flow diagram 600.

As shown in flow diagram 600, at least one application and its data may be identified, and the data from the application(s) may be input to a client database view (e.g., similar to a wrapper which may analyze each of the queries and other such data associated with the inputting application) for partitioning between a major portion (e.g., a client database, application database, and/or the like) and minor portion (comprising a plurality of option tables, option table 1, option table 2, option table 3, . . . option table N). Based on a determination and comparison of the optimization score(s) and/or other such associated data (e.g., preference weights, query occurrences, and/or the like) the system may apply the optimized data structure of a selected option table to the client database (major portion).

In some embodiments, each of the option tables may be generated manually by a developer(s) (e.g., by a developer(s) reviewing all the various queries and creating these option tables based on the query data, such as by selected or generating the indexes, the partitions, the hashes, and/or the like).

In some embodiments, each of the option tables may be generated programmatically and based on database recommendations. For example, modern database systems comprise a lot of their own insights and recommendations and when a query runs on the database, the database may first parse the query and create a plan for how the query will be executed (e.g., if the table has an index, then the database may decide to use or not use the index while reading the records from the table, whether the data can be retrieved just from the index such as from an index-organized table or fast-full index-scan, or whether the main table needs to be read from. Thus, and in some embodiments, the database itself may determine a method to read the data and respond to the query, which may then be used by the system in creating its option tables (e.g., which database method is best based on simultaneous evaluation).

FIG. 7 illustrates an exemplary table 700 of data for identifying the optimized data structure from the plurality of option tables, in accordance with an embodiment of the disclosure. In some embodiments, a system (e.g., similar to one or more of the systems described herein with respect to FIGS. 1A-1C) may perform one or more of the steps for generating exemplary table 700 For example, a system (e.g., the system 130 described herein with respect to FIG. 1A-1C) may perform the steps for generating exemplary table 700.

As shown in exemplary table 700, an exemplary data aggregator is shown as table 700. Thus, and for example, such a data aggregator may be analyzed (and in some instances interacted with and updated) by the system itself and/or by a client of the system (e.g., such as a developer of the client) in order to view and compare the data of each of the option tables in order to determine each optimization score and compare each optimization score. As shown under each option table column (e.g., option 1, option 2, option 3, option 4), the data aggregator may comprise an optimization score for each query analyzed (e.g., option 2 comprises optimization scores for each query of 120, 220, 180, and 910, sequentially). In some embodiments, a preference query weight may be weighted against each query and may be used by the system to identify the optimized data structure that should be picked (e.g., here, option 2 would be selected for its data structure as its weight is set to maximum).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamic and self-optimization for managing database transformation, the system comprising:

a memory device with computer-readable program code stored thereon;

at least one processing device operatively coupled to the at least one memory device and the at least one communication device, wherein executing the computer-readable code is configured to cause the at least one processing device to:

identify, by the at least one processing device, data;

apply, by the at least one processing device, the data to a split database table, wherein the split database table comprises a minor portion and a major portion, and wherein the minor portion is a pre-determined small portion of the split database table and the major portion is a leftover portion of the split database table exclusive from the minor portion;

partition, by the at least one processing device, the data and assign the data to the major portion or the minor portion based on a partitioning logic, wherein the partitioning logic partitions the data without duplicate data between the major portion and the minor portion;

generate, by the at least one processing device, a plurality of option tables comprising the data of the minor portion, wherein each option table of the plurality of option tables comprises an option data structure associated with a performance-based structural option for how to organize the split database table;

generate, by the at least one processing device, an optimization score for each option table simultaneously;

identify, by the at least one processing device, an optimized data structure from the plurality of option tables based on the optimization score for each option table, wherein the optimized data structure is identified based on at least one of a query occurrence count or a predefined query weight;

apply, by the at least one processing device, the optimized data structure to the major portion of the split database table, wherein the application of the optimized data structure to the major portion comprises an automatic re-organization of data within the major portion of the split database table to match the performance-based structural option of the optimized data structure; and iteratively update, in response to the application of the optimized data structure to the major portion, the plurality of option tables with a plurality of new option data structures, wherein the plurality of new option data structures comprises new option data structures different from the option data structure previously applied to the major portion, wherein with each iteration:

identify, by the at least one processing device, at least one new optimized data structure each time the plurality of option tables are updated, wherein the at least one new option data structure is identified based on the query occurrence count or the predefined query weight; and apply, each time at least one new option data structure is identified the at least one new option data structure to the major portion of the split database table.

2. The system of claim 1, wherein executing the computer-readable code is configured to cause the at least one processing device to:

automatically, based on the application of the optimized data structure to the major portion, optimize the split database table.

3. The system of claim 1, wherein executing the computer-readable code is configured to cause the at least one processing device to:

apply a performance tuning to the identification of the optimized data structure.

4. The system of claim 3, wherein the performance tuning occurs at predefined intervals or continuously.

5. The system of claim 1, wherein the predetermined small portion of the split database table comprises 1% or less of the split database table and the major portion is 99% or more of the split database table, and wherein data of the minor portion is mutually exclusive from data of the major portion.

6. The system of claim 1, wherein the optimization score is generated based on a response time for each option table.

7. The system of claim 1, wherein the optimization score is generated based on a resource execution burden for each option table.

8. The system of claim 1, wherein the optimization score for each option table is compared for the plurality of option tables, and wherein the optimized data structure is identified based on a lowest optimization score.

9. A computer program product for, wherein the computer program product comprises at least one non-transitory computer-readable medium having computer-readable program code portions embodied therein, the computer-readable program code portions which when executed by a processing device are configured to cause the processor to perform the following operations:

identify, by the processing device, data;

apply, by the processing device, the data to a split database table, wherein the split database table comprises a minor portion and a major portion, and wherein the minor portion is a pre-determined small portion of the split database table and the major portion is a leftover portion of the split database table exclusive from the minor portion;

partition, by the processing device, the data and assign the data to the major portion or the minor portion based on a partitioning logic, wherein the partitioning logic partitions the data without duplicate data between the major portion and the minor portion;

generate, by the processing device, a plurality of option tables comprising the data of the minor portion, wherein each option table of the plurality of option tables comprises an option data structure associated with a performance-based structural option for how to organize the split database table;

generate, by the processing device, an optimization score for each option table simultaneously;

identify, by the processing device, an optimized data structure from the plurality of option tables based on the optimization score for each option table, wherein the optimized data structure is identified based on at least one of a query occurrence count or a predefined query weight;

apply, by the at least one processing device, the optimized data structure to the major portion of the split database table, wherein the application of the optimized data structure to the major portion comprises an automatic re-organization of data within the major portion of the split database table to match the performance-based structural option of the optimized data structure; and iteratively update, in response to the application of the optimized data structure to the major portion, the plurality of option tables with a plurality of new option data structures, wherein the plurality of new option data structures comprises new option data structures different from the option data structure previously applied to the major portion, wherein with each iteration:

identify, by the at least one processing device, at least one new optimized data structure each time the plurality of option tables are updated, wherein the at least one new option data structure is identified based on the query occurrence count or the predefined query weight; and apply, each time at least one new option data structure is identified, the at least one new option data structure to the major portion of the split database table.

10. The computer program product of claim 9, wherein the computer-readable program code are configured to cause the processor to perform the following operations:

automatically, based on the application of the optimized data structure to the major portion, optimize the split database table.

11. The computer program product of claim 9, wherein the computer-readable program code are configured to cause the processor to perform the following operation:

apply a performance tuning to the identification of the optimized data structure.

12. The computer program product of claim 11, wherein the performance tuning occurs at predefined intervals or continuously.

13. The computer program product of claim 9, wherein the optimization score is generated based on a response time for each option table.

14. The computer program product of claim 9, wherein the optimization score is generated based on a resource execution burden for each option table.

15. A computer implemented method for, the computer implemented method comprising:

identifying, by at least one processing device, data;

applying, by the at least one processing device, the data to a split database table, wherein the split database table comprises a minor portion and a major portion, and wherein the minor portion is a pre-determined small portion of the split database table and the major portion is a leftover portion of the split database table exclusive from the minor portion;

partitioning, by the at least one processing device, the data and assign the data to the major portion or the minor portion based on a partitioning logic, wherein the partitioning logic partitions the data without duplicate data between the major portion and the minor portion;

generating, by the at least one processing device, a plurality of option tables comprising the data of the minor portion, wherein each option table of the plurality of option tables comprises an option data structure associated with a performance-based structural option for how to organize the split database table;

generating, by the at least one processing device, an optimization score for each option table simultaneously;

identifying, by the at least one processing device, an optimized data structure from the plurality of option tables based on the optimization score for each option table, wherein the optimized data structure is identified based on at least one of a query occurrence count or a predefined query weight;

applying, by the at least one processing device, the optimized data structure to the major portion of the split database table, wherein the application of the optimized data structure to the major portion comprises an automatic re-organization of data within the major portion of the split database table to match the performance-based structural option of the optimized data structure; and iteratively updating, in response to the application of the optimized data structure to the major portion, the plurality of option tables with a plurality of new option data structures, wherein the plurality of new option data structures comprises new option data structures different from the option data structure previously applied to the major portion, wherein with each iteration:

identify, by the at least one processing device, at least one new optimized data structure each time the plurality of option tables are updated, wherein the at least one new option data structure is identified based on the query occurrence count or the predefined query weight; and apply, each time at least one new option data structure is identified, at least one new option data structure to the major portion of the split database table.

16. The computer implemented method of claim 15, further comprising:

automatically, based on the application of the optimized data structure to the major portion, optimizing the split database table.

17. The computer implemented method of claim 15, further comprising:

applying a performance tuning to the identification of the optimized data structure.

18. The computer implemented method of claim 17, wherein the performance tuning occurs at predefined intervals or continuously.

19. The computer implemented method of claim 15, wherein the optimization score is generated based on a response time for each option table.

* * * * *